(12) United States Patent
Krell et al.

(10) Patent No.: US 6,841,497 B1
(45) Date of Patent: Jan. 11, 2005

(54) METHOD OF PRODUCING ALUMINUM OXIDES AND PRODUCTS OBTAINED ON THE BASIS THEREOF

(75) Inventors: Andreas Krell, Dresden (DE); Hongwei Ma, Dresden (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/926,513

(22) PCT Filed: Apr. 21, 2000

(86) PCT No.: PCT/DE00/01310
§ 371 (c)(1),
(2), (4) Date: Jan. 2, 2002

(87) PCT Pub. No.: WO00/69790
PCT Pub. Date: Nov. 23, 2000

(30) Foreign Application Priority Data

May 14, 1999 (DE) .......................... 199 22 492

(51) Int. Cl.$^7$ ........................... C08B 35/10; C04B 35/00
(52) U.S. Cl. ................. 501/153; 501/127; 51/309; 423/624; 427/457; 427/458; 427/532; 427/372.2
(58) Field of Search ............... 51/307, 309; 106/3; 501/127, 153; 423/624, 625; 427/532, 457, 372.2, 458

(56) References Cited

U.S. PATENT DOCUMENTS

| | | | |
|---|---|---|---|
| 4,259,311 A | | 3/1981 | Shah |
| 4,562,059 A | | 12/1985 | Asaoka et al. |
| 4,954,462 A | | 9/1990 | Wood et al. |
| 5,139,540 A | | 8/1992 | Najjar et al. |
| 5,185,299 A | | 2/1993 | Wood et al. |
| 5,395,407 A | | 3/1995 | Cottringer et al. |
| 5,925,592 A | * | 7/1999 | Katoh .................. 502/439 |
| 6,030,599 A | | 2/2000 | Noweck et al. |
| 6,048,577 A | | 4/2000 | Garg |
| 6,399,528 B1 | * | 6/2002 | Krell et al. .................. 501/80 |

FOREIGN PATENT DOCUMENTS

| | | |
|---|---|---|
| DE | 4116523 | 11/1991 |
| DE | 4407296 | 9/1995 |
| DE | 19638442 | 3/1998 |
| DE | 19515820 | 10/1998 |
| EP | 0294208 | 12/1988 |
| EP | 0554908 | 8/1993 |
| EP | 0678489 | 10/1995 |
| WO | 95/12547 | 5/1995 |

OTHER PUBLICATIONS

Ma, Burgard and Naβ annual report of the Institute for New Materials, Saarbrücken, 1994, pp. 65–67, no month.
D. Burgard et al, annual report of the Institute for New Materials, Saarbrücken, 1996, pp. 46–49, no month.
W.M. Zeng et al., NanoStructured Materials, vol. 10, No. 4, pp. 543–550, 1998, no month.
A. Larbot et al., High Tech. Ceram (1987) 143–151, submitted as C. Guizard et al., Recent Advances in Ceramic Membrane Processing, pp. 2743–2754 in: P. Vincenzini (ed.) Ceramics: Charting the Future, Techna Sri., Faenza (Italy), 1995, no month.
S. Alami–Younssi et al., Journal of Membrane Science, vol. 102, (1995) pp. 123–129, no month.
A.F.M. Leenars et al., Journal of Membrane Science, vol. 24 (1985) pp. 245–260, no month.
Li et al., Journal of Materials Science Letters, vol. 15, (1996) pp. 1713–1715, no month.
Bhaduri et al., NanoStructured Materials, vol. 7, No. 5, (1996) pp. 487–496, no month.
B.E. Yoldas, Bull. Am. Ceram. Soc., vol. 54, No. 3, (1975) pp. 289–290.
Kamiya et al., Journal of the Ceramic Society of Japan, Int. Edition vol. 104, No. 7, (1996) pp. 664–666, no month.
Yu et al., J. Am. Ceram. Soc., vol. 78, No. 11, (1995) pp. 3149–3152, no month.
Günay et al., Third Euro–Ceramics, vol. 1, (1993) pp. 651–656, no month.
Oberbach et al., cfi/Ber. DKG 74(1997) 11/12, pp. 719–722, no month.
Wood et al., Mater. Res. Symp. Proc. vol. 180, (1990) pp. 97–115, no month.
Sharma et al., J. Am. Ceram. Soc., vol. 81, No. 10, (1998) pp. 2732–2734, no month.

* cited by examiner

Primary Examiner—Michael A Marcheschi
(74) Attorney, Agent, or Firm—Greenblum & Bernstein, P.L.C.

(57) ABSTRACT

The invention relates to the field of technical ceramics and specifically relates to a method of synthesis for aluminum oxides of different crystalline structure and to the products obtained by the method. The aim of the invention is to provide a method of producing redispersible nanoparticulate corundum and nanoporous $Al_2O_3$ sintered products, the method using precursors and being viable on a commercial scale. To this aim, inter alia, a method of producing redispersible nanoparticulate corundum of an average particle size of $D_{50}<100$ nm is used which method includes the addition of crystal nuclei. According to the method, organic or chlorine-free inorganic precursors are dissolved or processed to a sol and hydrolyzed. The substance is then dried and calcinated at temperatures of between 350 and 650° C. and is then further heated by increasing the temperature to $\leq 950°$ C. The aim of the invention is also attained by using a method of producing nanoporous $Al_2O_3$ sintered products according to which organic or chlorine-free inorganic precursors are dissolved or processed to a sol and hydrolyzed. The substance is then dried and calcinated at temperatures of between 350 and 750° C.

45 Claims, 2 Drawing Sheets

METHOD OF PRODUCING ALUMINUM OXIDES AND PRODUCTS OBTAINED ON THE BASIS THEREOF

BACKGROUND OF THE INVENTION

1. Field of the Invention

Figure 1:
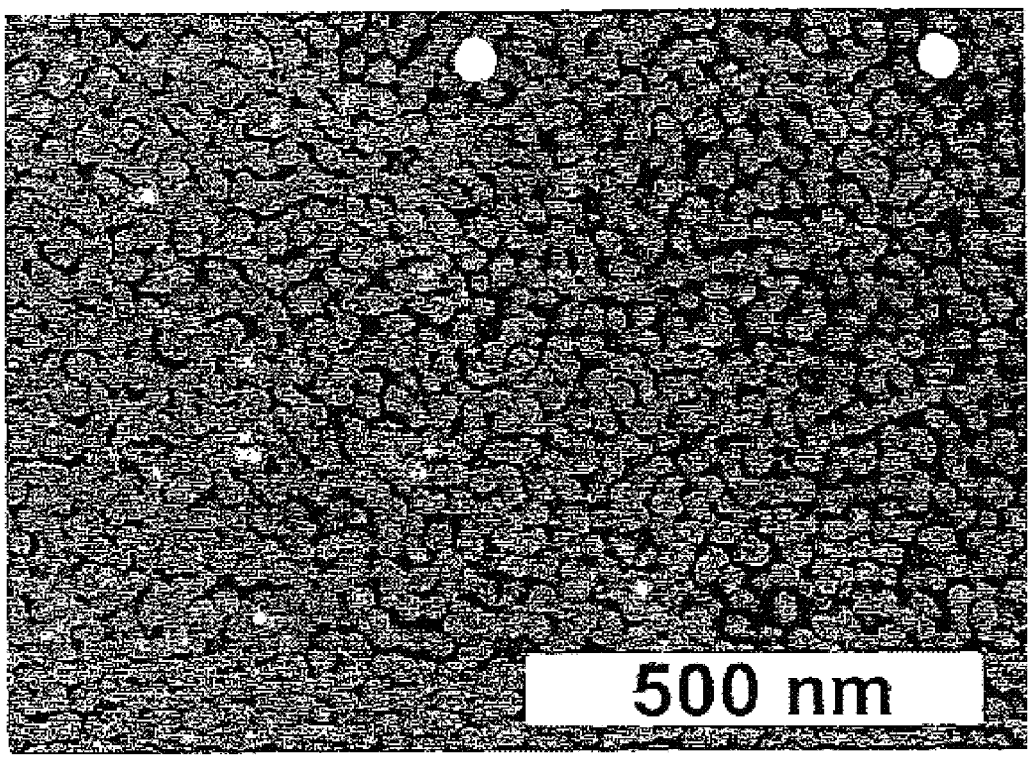
Figure 2:

The invention relates to the field of industrial ceramics and involves a process for synthesizing aluminum oxides of different crystal structures and the products made from them, such as, for example, can be used as powdered raw materials, as porous filtration membranes or catalyst carriers, as dense sintered substrate layers or dense expendable parts.

2. Discussion of Background Information

Ceramic sintered products based on aluminum oxide ($Al_2O_3$), particularly corundum ($\alpha$-$Al_2O_3$), are widely used due to the advantageous chemical and oxidative resistance of these products, in particular in the latter modification. This applies both to dense sintered products (for example, as tool material or wear-resistant machine parts), and to porous components (for example, as catalyst carriers or as filtering material). While dense structures having crystal sizes >2 $\mu$m have been known for a long time, it has been possible to produce submicron structures only since the mid-80s by new sol/gel processes and since the beginning of the 90s as a result of the availability of finer crystalline corundum powders (grain size $\geq$150 nm). Since then, the development of more and more finely structured sintered structures has been a priority goal for ceramic material development, both in the field of dense sintered products with the goal of greater hardness and wear resistance, and in the field of porous materials, e.g., for ultrafiltration membranes. Future advances are determined decisively by further development of more and more fine-grained raw materials.

Synthetic ceramic raw materials can exist in very different forms: in a phase version to be used directly for the subsequent production process of ceramic products (e.g., as corundum [$\alpha$-$Al_2O_3$]), in an intermediate phase (for example, as one of the so-called transitional aluminum oxides, such as $\gamma$-$Al_2O_3$, which can also be used directly for certain ceramic processes), or as preliminary chemical stages (so-called precursors). Thus, aluminum monohydrates, AlOOH, crystallized as boehmite or diaspore, can serve as precursors for the production of aluminum oxides, while, a stage earlier, compounds such as aluminum chlorohydrate, $Al_2(OH)_5Cl.(2\ldots3H_2O)$, aluminum sec-butoxide, $Al[O(CH_3)CHC_2H_5]_3$, aluminum tri-isopropoxide, $Al[OCH(CH_3)_2]_3$, represent inorganic or organic precursors for the production of AlOOH. Most of these raw materials, such as, e.g., boehmite, can exist as a sol, as a dispersion in liquid media, (for example, in water), or as a dry powder and at the same time have different states of agglomeration or aggregation. If the crystallites can occur as coherent aggregates, as agglomerates insoluble with simple agents, or also as separate, easily dispersible individual crystallites, the latter case is desired for many ceramic processing methods. However, with decreasing crystallite size it is increasingly difficult to realize, so that the size of dispersible particles is mostly considerably larger than the crystallite size.

Therefore, for a quantitative, industrially relevant evaluation of the fine grain characteristics of such raw materials, the primary particle size determined preferably by x-ray diffraction (often called crystallite size) must be carefully differentiated from the size of separate particles. The latter is defined by well-dispersed powder suspensions, for example, by means of dynamic light scattering, laser diffraction, or sedimentation (coupled with extinction measurement). Besides the median value of the distribution by volume, $D_{50}$ (corresponding to 50% by volume), the coarse end of the distribution has particular significance, characterized, for example, by $D_{84}$, for the technical behavior of the powder. The estimate of average particle sizes from specific surface or from qualitative evaluations of electron microscope photographs, often practiced as a substitute in the lack of adequate powder quantities, can lead to serious estimate errors, in the first case, because the specific surface, as a result of the contributions of surface roughness and finest grain components, is frequently considerably higher than a corresponding average grain size, and in the second case, due to the often insufficient differentiability of coherent crystallites and dispersible particles in the electron-microscopic image. Thus W. M. Zeng et al. (NanoStructured Mater. 10 (1988) 4, 543–550) report of a synthesized "nano" corundum having average crystallite sizes of about 25–30 nm (estimated according to specific surface and TEM), whereas the particle size distribution by volume at $d_{50}$=0.75 $\mu$m has three times the median value of the finest corundum powder commercially available for 10 years.

It is indispensable for the estimation of technically relevant properties (for example, for processibility) to evaluate the mass or volume characteristic property of the particle size distribution, instead of numerical distributions. The latter is often preferred, if exploratory processes yield very small synthesized powder quantities that cannot be evaluated by conventional particle measurement technology, so that distributions are estimated by counting particles using electron microscope photographs. When conversion into a distribution by volume is omitted, the numerical overweighting of the finest grain proportion simulates technically unrealistically low distribution parameters and can cause considerable judgment errors. Thus one publication reports on a so-called "nano" corundum powder having a primary particle size of 50–60 nm (corresponding to the maximum of the numerical distribution curve) and notes that 90% of the particles are smaller than 90 nm (D. Burgard et al., Annual Report of the Institute for New Materials, Saarbrücken, 1996, pages 46–49). The stated number distribution shows, however, that the median value, $D_{50}$ of the distribution by volume (corresponding to 50% by volume) is 170 nm and $D_{90}$=300 nm. With that, this "nano" powder is not more fine-grained either than the finest corundum commercially available for the past ten years (e.g., TM-DAR, having $D_{50}$=140–200 nm, from Boehringer Chemicals, Japan).

The finest grain corundum powders commercially available today at prices <150 DM/kg show average particle sizes $\geq$150 nm. Further applicable fractions <200 nm having $D_{50}$=120 nm can be obtained from these at greater cost, but portions <100 nm hardly worth mentioning. Even finer $Al_2O_3$ powders are available as so-called transitional aluminum oxides (e.g., $\gamma$-$Al_2O_3$ or $\delta$-$Al_2O_3$), and also layers of such transitional phases also result with the sol/gel synthesis of thin ultrafiltration membranes; still finer pores are produced on the basis of zeolites, $TiO_2$, or mixed oxides. However, these phases have a number of shortcomings regarding both their inherent properties and their behavior in further processing:

In the use of transitional phases of $Al_2O_3$ (for example, as a $\gamma$-$Al_2O_3$ ultrafiltration membrane having pore sizes $\geq$approx. 3 nm), the chemical and thermal resistance of the products is clearly lower than for corundum. However, it has not been possible to produce the latter in the same grain fineness until now, because the transformation of the transitional aluminum oxides into the α phase occurs only at higher temperatures and then is associated with a coarsening of the particles.

Irrespective of the production route for the synthesis of finer crystalline boehmite starting with commercial boehmite (A. Larbot et al., High Tech. Ceram (1987) 143–151) or by controlled hydrolysis of organic precursors ("Yoldas Process," S. Alami-Younssi et al., J. Membr. Sci. (1995) Special Issue, 123–129), the finest average pore diameters attainable with $Al_2O_3$ membranes (γ-phase) are values between approx. 3 and 5 nm, whereby the boehmite formed as an intermediate stage yields a highly anisotropic particle form of $Al_2O_3$, which diminishes permeability by a factor of 2–3 (A. F. M. Leenars et al., J. Membrane Sci. 24 (1985) 245–260). The combination with a hydrothermal treatment makes possible pore sizes of 2.5 nm, if calcination is at so low a temperature that complete conversion into $Al_2O_3$ does not occur (M. S. Najjar et al., U.S. Pat. No. 5,139,540: "membrane of . . . alumina containing aluminum-oxygen repeating units and bearing alkoxide groups"). The production of nonmetallic inorganic membranes having pore sizes of less than 1–3 nm has hitherto been described for materials of less chemical resistance, such as hydroxides, zeolites, other silicate compounds and on the basis of $TiO_2$ and $ZrO_2$. In the field of $Al_2O_3$ materials, pore sizes between 0.5 and 2.5 nm have been described for "aluminum oxide" compositions of an undefined phase. However, the very special production from aluminoxanes that are difficult to synthesize, extremely reactive and complicated to handle, excludes wider utility (N. v. Thienen, DE 196 38 442 A1: Fluidized Bed Hydrolysis in Inert Gas with Small Quantities of Water Vapor Over Cooled Ice). In the production of dense sintered products starting with transitional aluminum oxides or (in the scope of the sol/gel process) from precursors, there is an unavoidable succession of a whole series of phase transformations that all start with controlled nuclei formation at initially few sites on the still porous structure, and then are spread spherically starting from such nuclei. The spatially heterogeneous distribution of the random nuclei allows the development of irregular, often vermicular pore shapes and crystallite shapes, which adversely affect the properties. Although this undesired structure development in the scope of sol/gel technologies that start from AlOOH, can be largely suppressed by the further addition of the finest possible crystallite corundum nuclei (more recent embodiments, such as U.S. Pat. No. 5,395,407, describe, for example, dense polycrystalline abrasive grains having average crystallite sizes of 0.2–0.4 μm), it has been questioned whether defects typical for the sol/gel process can actually be avoided in this manner (A. Krell et al., EP 678 489 A1).

Therefore, a widespread interest exists in the development of processes that are technically easier to operate for making porous $Al_2O_3$ sintered products having pore sizes <2.5 nm (with high permeability) and $Al_2O_3$ raw materials that fulfill the condition of particle size <100 nm and are present predominantly as corundum (α-$Al_2O_3$). Furthermore, technologies must be developed to convert such raw materials into sintered products. An α-$Al_2O_3$ aluminum oxide that meets the cited demands will be designated in the following as nanocorundum for short, and be defined by limiting the parameter $D_{50}$ to a value <100 nm; advantageously, furthermore, a narrow distribution of particle sizes should also be achieved, described by $D_{84} \leq 150$ nm. The difficulty to be overcome in the synthesis of nanocorundum results from the fact that the requirements for extremely fine grain and α-phase (corundum) require opposite synthesis conditions:

the thermodynamically stable corundum phase always requires the highest transformation temperature as the last stage in the sequence of phase conversions, minimum grain sizes, on the other hand, can be obtained only at minimum temperatures.

An advantageous compromise could be reached soonest by using diaspore as the starting material, because this monohydrate, as the single known preliminary stage, converts directly into corundum by avoiding transitional phases and already does so at 450° C. by 750° C. at most. However, diaspore is not known with particle sizes <100 nm from preparation of natural sources or by artificial synthesis (for example, hydrothermally). However, if the starting material is available only as coarse grains, the uniquely low conversion temperature cannot be used to produce nanocorundum, either.

Special routes, such as hydrolysis of activated aluminum layers (Li et al., J. Mater. Sci. Lett. 15(1996)19, 1713) or the exothermic reaction of an aluminum salt (aluminum nitrate) with urea (Bhaduri et al., NanoStructured Materials 7(1996) 5, 487) have not hitherto led to adequate quantities of dispersible nanocorundum for tests on the production feasibility of sintered products. Most of the developments pursued until now, therefore, start with nanocrystalline aluminum hydroxides that are convertible to the sol state, preferably boehmite (AlOOH), or with precursors of the hydroxides. In the first case, particular closeness to convertible solutions is given by the fact that companies have long offered commercial boehmite as a powder or sol, its crystallite size being approx. 10 nm and its particle size, depending on the state of dispersion, being described as having values of about 50 nm (for example, from Condea (Hamburg) under the designations Pural SB or Dispersal). Starting with such raw material and without additional measures, such as a nucleating or doping additive, a transformation to α-$Al_2O_3$ is observed only from $T_\alpha = 1205$–$1220°$ C.

Within the scope of the use of the cited type of boehmite, it is known that $T_\alpha$ is shifted to lower values by various types of doping or by the addition of nuclei. However, it is also known that a transformation temperature cannot thereby fall appreciably below 1100° C. Thus, according to our own investigations, dopants, such as Ti, Mn, Zr, drop $T_\alpha$ to 1155±20° C., depending on the type of input. Somewhat more favorable values of about 1100±25° C. are attained by the addition of 0.5–4% corundum nuclei or diaspore nuclei having an average particle size of 100–150 nm. An exception among dopants is the addition of $ZnF_2$, which renders possible a transformation temperature of 1035°; however, fluorine promotes grain growth in $Al_2O_3$, so that this route is not practicable for the production of finer grain corundum crystallites. Although in principle, we can speculate whether still lower $T_\alpha$ might possibly be conceivable with still finer grain α nuclei <100 nm, in the absence of appropriate investigation possibilities, it has hitherto remained open as to whether the real magnitude of such an effect is actually relevant. However, pertinent nuclei possible for such investigations are not available in defined particle size and purity as long as nanocorundum is unknown (the use of long-known corundum nuclei produced by ball mill grinding is often ruled out for reasons of purity, because really fine grain grinding occurs primarily with $Al_2O_3$ grinding balls containing $SiO_2$). Although Burgard et al. claim to have conducted investigations on corundum synthesis from precursors with "nanocrystalline $\alpha$-Al$_2$O$_3$ seed crystals" (annual report of the Institute for New Materials, Saarbrücken, 1996, pp. 46–49), the stated numerical particle size distribution indicates an average value of 170 nm for the volume distribution of the nuclei and thus hardly differs from the finest grain commercial corundum powder available for 10 years.

Due to these difficulties, there has hitherto been no knowledge indicating a reduction in the transformation temperature $T_\alpha$ of more than 150° C., i.e., to less than 1050° C., starting with boehmite of the aforesaid type, could be expected from the addition of even the finest grain nuclei. Moreover, the above-stated data in the literature on the observed transformation temperatures $T_\alpha$ are related mostly to the temperature of the peaks of DTA curves, recorded at heating rates of 5–10 K/min. This temperature agrees approximately with that at which complete conversion into corundum is reached within a time t<30 minutes. Partial conversion of a lower percent after a longer time is often possible at a lower temperature, but is of little relevance industrially. By annealing for several hours with the addition of the finest grain nuclei, a proportion of 80–100% corundum phase can be achieved from approx. 1000° C. In view of these high transformation temperatures, which have not been fallen below until now, it is not surprising that none of the cited measures has hitherto led to the development of redispersible, commercially feasible nanocorundum.

Therefore, attempts have been made for a long time to overcome the problem of high transformation temperatures and the associated particle growth by synthesizing as a raw material starting from precursors a boehmite that is not only on a nano scale relative to crystallite size, but also dispersible at this level in its particle structure. Conventionally, this takes place by hydrolysis of aluminum alkoxides in water at temperatures >70° C., whereby precipitates are formed that are peptized by the addition of acid (B. E. Yoldas, Bull Am. Ceram. Soc. 54(1975)3, 289–290). The precipitate formation makes it difficult to control particle size as desired, and also the marked shape anisotropy of the resulting boehmite is unfavorable for many uses. However, with extreme effort to suppress the growth of the boehmite crystals (extreme dilution of 0.025 mole al-sec-butoxide, of the sol at a temperature reduced to 8° C.) a beginning corundum formation can actually be observed from 500° C. in the subsequent calcination (approx. 10% corundum after 4 hours—Kamiya et al., J. Ceram. Soc. Japan/Int. Edition 104(1996)7, 664). However, an appreciable yield even of transitional $\theta$-Al$_2$O$_3$ preceding corundum formation starts from 800° C. only (the very clear $\theta$-Al$_2$O$_3$ radiographic diagram from Yu et al., J. Am. Ceram. Soc. 78 (1995) 11, 3149 was erroneously identified as corundum). The actual transformation temperature for corundum formation from optimized organic and inorganic precursors is, according to unanimous data in the advanced literature, at $T_\alpha$=1100±20° C. and, therefore, not lower than known, also starting with commercial boehmite (doped or mixed with nucleating agents):

1080° C. starting with aluminum tri-isopropoxide (Günay et al., 3 Euro-Ceramics (1993), volume 1, 651), 1100° C. starting with aluminum sec-butoxide or aluminum chlorohydrate (Al$_2$(OH)$_5$Cl.(2 . . . 3H$_2$O) (Oberbach et al., cfi/Ber. DKG 74(1997)11/12, 719), 1095–1113° C. starting with aluminum nitrate (Wood et al., Mater. Res. Symp. Proc. Vol. 180(1990), 97).

In view of the effect of corundum or diaspore nuclei in decreasing $T_\alpha$ by 100–200° C. in the use of commercial boehmite, it was, therefore, to be expected that addition of nuclei in processes starting with precursors would also decrease the corundum formation temperature by a similar amount, i.e., to 900–1000° C. and thus make smaller crystallite sizes possible. However, the results that have hitherto become known from such tests confirm this supposition only with regard to the temperature and only for individual precursors of those investigated. Disappointingly, the desired production of nanocorundum, even where $T_\alpha$ was actually reduced, proved to be impossible by this route and advanced investigations with the finest grain nuclei show, contrary to expectations, a complete lack of influence of the nucleating additives on the grain size of the synthesized corundum:

Starting with aluminum sec-butoxide, 10% by weight Fe$_2$O$_3$ nuclei (hematite) are required to reduce T$\alpha$ to 970° C., yet the "production of very fine $\alpha$Al$_2$O$_3$ is not possible by this method" (Oberbach et al., cfi/Ber. DKG 74(1997)11/12, 719).

Starting with aluminum chlorohydrate, although Al$_2$(OH)$_5$Cl.(2 . . . 3H$_2$O), $T_\alpha$ can be reduced even to 750° C., but a crystallite size of approx. 60 nm (at a larger unspecified particle size!) is maintained only if the calcination temperature is limited to 700° C., whereas 900° C. are required for complete elimination of the chlorine which is unfavorable for further use of the synthesis product. A third disadvantage, in addition to particle size and chlorine content, lies in the necessity of using a very special, difficult to produce precursor, Al$_2$(OH)$_5$Cl.(2 . . . 3H$_2$O): if untreated aluminum chloride is used instead, $T_\alpha$ amounts to 1100° C. despite nucleus addition (Oberbach and others, cfi/Ber. DKG 74(1997)11/12, 719). The important role of chlorine for the internal defect structure of the calcined gels and thus for the further transformation behavior was also confirmed by other sources (Wood et al., Mater. Res. Sym. Proc. (1990), volume 180, 97).

Sharma et al. (J. Am. Ceram. Soc. 81 (1998) 10, 2732–34) attempted to solve this problem by the (expensive) route of hydrothermal treatment starting with the customary aluminum chloride, AlCl$_3$.5H$_2$O, and adding 4% $\alpha$-Al$_2$O$_3$ nuclei. Although it was possible to reduce the temperature required for complete conversion of the preliminary stage into corundum to 950° C., the average particle size increased thereby to 111 nm (compared to 60–70 nm in the hydrothermal product still containing boehmite).

The substitution of the chlorides by aluminum nitrate has not hitherto yielded nanocorundum having a median value of distribution by volume of $D_{50}$<100 nm, either; surprisingly, additionally added nanocorundum nuclei do not yield more finely crystalline synthesis product. Although DE 195 15 820 A1 (D. Burgard et al.) reports a corundum powder calcined at 1050° C., having a particle size between 40 and 60 nm, the principal author defines these statements more precisely in essential points in two other places. (1) A publication by Ma, Burgard and Naβ (annual report of the Institute for New Materials, Saarbrücken, 1994, pp. 65–67) shows that the information in the unexamined German application concerns a primary crystallite size determined by x-ray diffraction. (2) In an otherwise identical process, finer crystallite size is surprisingly not achieved with the addition of corundum nuclei despite a reduced corundum formation temperature, but rather a similar primary particle size of 50–60 nm is observed, measured at the maximum of the numerical distribution (D. Burgard et al., annual report of the Institute for New Materials, Saarbrücken, 1996, pp. 46–49); the stated numerical distribution curve of the redispersed synthesis product shows that $D_{50}$ of the distribution by volume lies in the range of 130–170 nm and thus could not be reduced compared to the finest grain commercial aluminum oxides. The nuclei used are described as "nanocrystalline α-$Al_2O_3$ produced therefrom [from this synthesis]", without quantifying the properties in more detail.

α-$Al_2O_3$ and hematite nuclei were also used within the scope of the glycothermal synthesis of corundum particles starting with gibbsite (Al(OH)$_3$) dissolved in butanol. Although it was possible to reduce the particle size of the corundum formed by an increasing concentration of α-$Al_2O_3$ nuclei from 3–4 βm to ultimately 100–200 nm, the production of corundum was not possible.

According to DE 41 16 523 A1, a process is also known for producing α-$Al_2O_3$ through hydrolytic condensation of aluminum compounds. Accordingly, aluminum compounds that can be hydrolyzed are converted with β-diketones into aluminum/β-diketone complex compounds before hydrolysis, subsequently these compounds are condensed and heated to relatively high temperatures >900° C., e.g. 1100° C.

Likewise known is a process according to WO 95/12547 for producing water dispersible aluminum hydrates of boehmite structure and application of the same. Colloidal dispersions with a pH value of between 3 and 7 are produced in which the boehmite or pseudoboehmite is present in nanocrystalline structures. A corundum polishing medium produced from this shows crystallite sizes of 60–90 nm determined by x-ray diffraction; information on particle size was not given.

According to EP 0 554 908 A1, fine $SiO_2$-coated α-aluminum oxide powders, their production and use are known. This nano-powder of α-aluminum oxide can be produced from boehmite gel that is coated with a barrier-forming material, such as silicon oxide, by drying and sintering. However, pure $Al_2O_3$ powders cannot be produced by using a grain growth inhibitor ($SiO_2$).

In summary, the disadvantages of the known prior art can be described in that no process exists with which a chlorine-free nanocorundum having a particle size distribution described by $D_{50}$<100 nm can be produced with or without the use of nuclei in a quantity adequate for further processing into sintered products; the expression chlorine-free describes here compositions having less than 0.05% by weight chlorine (e.g., as an impurity). Also, neither sintered corundum products with submicrometer or nanostructures, which can be produced from such nanocorundum, nor nanoporous $Al_2O_3$ sintered products having pore sizes in the range between 0.5 and 2.5 nm that can be produced from raw materials easy to handle are known.

SUMMARY OF THE INVENTION

The present inventions relates to a process for the production of chlorine-free nanocorundum of various porosities as an end or intermediate product, whereby the intermediate product can be processed further according to the invention to other products according to the invention.

The task of the invention is, therefore, the description of a process structured on chlorine-free precursors of aluminum hydrates or hydroxides and operable on industrial scales for the production of redispersible nanocorundum at temperatures ≦950° C. and of nanoporous $Al_2O_3$ sintered products as well as the description of powder-form or sintered corundum products and their production.

The characterization of the nanocorundum by $D_{50}$<100 nm delimits the desired raw material product from the finest grain corundum powders hitherto available, which have average particle sizes ≧150 nm and from which fractions <200 nm, but hardly appreciable proportions <100 nm can be separated. The objective of a process operable on industrial scales rules out methods that render possible only extremely low daily productions (such as the surface hydrolysis of aluminum metal or the explosive annealing of aluminum metal threads) or in which the yield of fine grain, redispersible corundum particles <100 nm constitutes less than 25% of the total $Al_2O_3$ obtained. The task of the invention is further the production of dense and porous sintered corundum products from the nanocorundum produced according to the invention or its special preliminary steps and the description of such products.

The term corundum thereby characterizes compositions of more than 98% $Al_2O_3$ for powder and sintered ceramics, which are produced according to the invention, whereby the aluminum oxide is present as corundum phase (α-$Al_2O_3$) at more than 60% (in powders) and more than 75% (in sintering products) and can be provided with the dopants or impurities, conventional for such products, influencing the sintering behavior; these dopants or impurities can be applied in the known manner. As far as the corundum proportion of the $Al_2O_3$ is concerned, higher contents of more than 80% in powders and more than 95% in sintering products are preferred, however, the quantitatively exact detection by x-ray diffraction is often difficult due to the different degrees of crystallization of the different $Al_2O_3$ phases. Especially in synthesized powders present predominantly as a corundum phase, a higher residual content of transitional phases can be tolerated compared with sintering products, if the particle structure ensures an adequate redispersibility at the required level of the particle size distribution by volume; on sintering, the corundum particles act then as nuclei on the residual content of transitional phases and ensure the development of a homogeneous grain structure. The production of nanoporous $Al_2O_3$ sintering products without restriction to a special phase supply and having pore sizes in the range between 0.5 and 2.5 nm from easily manageable raw materials is another task of the invention.

The present invention is directed to a process for producing redispersible nanocorundum with an average particle size $D_5$<100 nm with addition of nuclei that promote transformation to corundum in subsequent annealing, comprising:

(a) dissolving in a liquid medium or processing in a liquid medium to a sol, as starting materials, chlorine-free inorganic precursors;

(b) hydrolyzing the solution or the sol of (a) through the addition of a base in a mole ratio of base:precursor of 1 to 3;

(c) aging the hydrolyzed solution or sol of (b) at temperatures between 60 and 98° C. for 1 to 72 hours;

(d) subsequently drying the aged solution or sol of (c) followed by calcination at temperatures between 350 and 650° C. for converting hydrolyzed precursor into a semiamorphous intermediate phase and ultimately into transitional aluminum oxides; and (e) performing further annealing by increasing temperature to ≦950° C. for converting product of (d) into corundum phase.

The present invention is also directed to a process for producing redispersible nanocorundum with an average particle size $D_{50}$<100 nm with addition of nuclei that promote transformation to corundum in subsequent annealing, comprising:

(a) dissolving in a liquid medium or processing in a liquid medium to a sol, as starting materials, organic precursors;

(b) hydrolyzing either (i) with excess water through addition of the precursor solution or the precursor sol of (a) to water at a mole ratio of water:precursor >3, and with addition of an acid that leads to pH=3–5, or (ii) through addition of an amount of water restricted to a mole ratio of water:precursor ≦3 to the precursor solution or precursor sol of (a) that are to be mixed with complex-forming ligands;

(c) aging the hydrolyzed solution or sol of (b) at temperatures of ≦50° C. within 5 hours, and subsequently aging at temperatures of 80 to 98° C. within 1 to 24 hours;

(d) subsequently drying the aged solution or sol of (c) followed by calcination at temperatures between 350 and 650° C. for converting the hydrolyzed precursor into a semiamorphous intermediate phase and then to transitional aluminum oxides; and (e) performing further annealing by increasing temperature to ≦950° C. for converting product of (d) into corundum phase.

The calcination can be carried out at temperatures of 400 to 600° C. for 0.5 to 2 hours, and the further annealing for formation of corundum can be carried out by a temperature increase to 650–900° C. for 0.5 to 1 hours.

The at least one of the transitional aluminum oxides and corundum can be ground.

The grinding of the at least one of the transitional aluminum oxides and corundum can be carried out in an organic liquid.

After the aging of the hydrolyzed solution or sol, a gel formation or a liquid shaping can be carried out, subsequently the drying, calcination and annealing can take place and after the annealing a sintering can be carried out at temperatures above the corundum formation temperature.

The present invention is also directed to nanocorundum powders comprising a close particle size distribution in low nanometer range, comprising a narrow width of size distribution of isometrically formed particles $D_{84}$<150 nm, less than 0.05% by weight chlorine, at least 60% α-aluminum oxide, and the powders are redispersible.

The present invention is also directed to a process for the production of sintered corundum products in a form of dense or porous compact bodies, layers or granulates, comprising sintering nanocorundum powders according to the present invention at temperatures ≦1450° C. to form granulate or sintered corundum bodies having an average grain size of ≦0.6 μm.

The present invention is also directed to a process for coating a porous or dense metallic substrate wherein particles of the hydrolyzed sol or particles of a suspension of nanocorundum produced according to the present invention are electrophoretically deposited on the metallic substrate, and subsequently subjected to annealing.

The present invention is also directed to a process for the production of sintered porous or dense corundum layers wherein the aged the hydrolyzed solution or sol of (c) according to present invention is applied to a substrate and afterwards the drying, calcination and annealing are carried out.

After the aging of the solution or the sol, the material can be deposited on a substrate with gel formation.

After the annealing for coverting into the corundum phase, a sintering can be carried out at temperatures above the corundum formation temperature.

After annealing, at least one further coating and at least one further annealing can be carried out.

The present invention is also directed to $Al_2O_3$ sintered products, produced according to the present invention, wherein through annealing at 650 to 1250° C., there is a phase composition of more than 80% corundum and an average pore size of 10–100 nm with a porosity of ≧30% by volume.

The present invention is also directed to dense sinter corundum layers, produced according to the present invention, on a materially different type of substrate, in which through sintering at a temperature of ≦1250° C. there is an average grain size of ≦0.5 μm.

The present invention is also directed to a process for producing nanoporous $Al_2O_3$ sintered products comprising:

(a) dissolving in a liquid medium or processing in a liquid medium to a sol, as starting materials, chlorine-free inorganic precursors;

(b) hydrolyzing the solution or the sol of (a) through the addition of a base in a mole ratio of base:precursor of 1 to 3;

(c) aging the hydrolyzed solution or sol of (b) at temperatures between 60 and 98° C. for 1 to 72 hours; and (d) subsequently drying followed by calcination at temperatures between 350 and 750° C. for converting hydrolyzed precursors into aluminum oxide.

The present invention is also directed to a process for producing nanoporous $Al_2O_3$ sintered products, comprising:

(a) dissolving in a liquid medium or processing in a liquid medium to a sol, as starting materials, organic precursors;

(b) hydrolyzing either (i) with excess water through addition of the precursor solution or the precursor sol of (a) to water at a mole ratio of water:precursor <3, and with addition of an acid that leads to pH=3–5, or (ii) through addition of an amount of water restricted to a mole ratio of water:precursor ≦3 to the precursor solution or precursor sol of (a) that are to be mixed with complex-forming ligands;

(c) aging the hydrolyzed solution or sol of (b) at temperatures of ≦50° C. within 5 hours, and subsequently aging at temperatures of 80 to 98° C. within 1 to 24 hours; and (d) subsequently drying the aged solution or sol of (c) followed by calcination at temperatures between 350 and 750° C. for converting hydrolyzed precursors into aluminum oxide.

The aged solution or the sol can be applied to a substrate and afterwards the drying and calcination can be carried out.

The gel formation can occur upon application to a substrate.

Nuclei of a transitional aluminum oxide can be added to the solution or to the sol.

The present invention is also directed to a process for coating a porous or dense metallic substrate, wherein particles of hydrolyzed sol or particles of a suspension of nano porous aluminum oxide according to the present invention are electrophoretically deposited on the metallic substrate.

After the electrophoretic deposit of the particles, a heat treatment can be carried out at temperatures of 350–750° C.

The present invention is also directed to nanoporous $Al_2O_3$ sintered products, produced according to the present invention in which there is an average pore diameter in the range between 0.5 and 2.5 nm at a porosity of ≧30% by volume.

DETAILED DESCRIPTION OF THE INVENTION

According to the invention, a process is stated that leads to the production of nanocorundum, whereby the process, on one hand, is not completely finished (lower calcination level) and thereby intermediate products (nanoporous products) result, which can be processed further according to the invention to the products (nanoporous $Al_2O_3$ sintering products) according to the invention or whereby the process, on the other hand, is completely finished (higher calcination level) and leads to intermediate products (mesoporous sintering products of nanocorundum), which can then lead to various products according to the invention (nanocorundum powder, $Al_2O_3$ sintering products or dense sintering corundum coatings), subject to the processing methods according to the invention. These products are novel and can be used for the first time according to the invention.

The process according to the invention for the production of redispersible nanocorundum having an average particle size $D_{50}<100$ nm with the addition of nuclei that promote the transformation of corundum in the subsequent annealing, takes place according to the following steps.

Nuclei are added to the chlorine-free inorganic precursor solution or precursor sol, which promote the final corundum formation. Nuclei concentrations between 2 and 20% by weight (relative to the $Al_2O_3$ yield) have proven favorable for the process described here. Known nuclei types are corundum ($\alpha$-$Al_2O_3$), diaspore crystals or hematite crystals ($\alpha$-$FeO_2$)$_3$. Because the nuclei are primarily effective if they are present as very fine grains, known processes (for example, in the sol/gel production of densely sintered corundum grinding agents having submicrometer structure of commercial boehmite) use corundum nuclei that must be obtained by ball mill grinding or screening of coarser aluminum oxides. Both are difficult and not very economical. In comparison, the use of the finest crystalline nuclei in the course of the present invention is considerably facilitated when the nanocorundum product according to the invention can itself be used a nucleus material for the following syntheses.

The hydrolysis of the solution or sol is brought about by adding a base in the mole ratio base:precursor=1:3.

This is followed by an ageing at temperatures of 60 to 98° C. for 1 to 72 hours.

The calcination of the hydrolyzed and aged solution or sol for the conversion of the hydrolyzed precursors into the semiamorphous intermediate phases (aluminum hydroxide) and then to transitional aluminum oxides takes place at 350–650° C., advantageously between 400 and 600° C. for 0.5–2 hours.

The annealing to corundum formation takes place at temperatures $\leq 950°$ C. To maintain a fine particle size, times of 0.5–1 hour are favorable, advantageous results are achieved at 600–900° C.

If the annealing takes place in the upper range of this temperature interval, it is accompanied by a partial formation of leading sintering necks between individual powder particles. In the case of a redispersion necessary for the further use of the powder, this can be done, for example, by milling. Thus, as in the known process based on the above-mentioned work by Yoldas, the resulting coarse or agglomerated portion of the boehmite formed is separated by conventional processes, such as centrifuging or decantation, it is also possible here to separate remaining agglomerate residues in the same manner from the redispersed individual particles. This is advantageously possible within the scope of the process according to the invention in particular, because here the disadvantage of other processes that achieve only an uneconomically low yield of redispersible corundum particles <100 nm from less than 25% of the total $Al_2O_3$ obtained, is avoided.

In the course of the calcination, a corundum proportion of the $Al_2O_3$ of more than 80% is advantageously produced. However, if a calcination temperature of 800–900° C. is required for this (determined by the concrete form of the preceding synthesis), it can be advantageous, in view of the desired good dispersibility of the calcined nanocorundum and with regard to the sintering neck formation starting at about 800° C. which counteracts it, to prefer a lower calcination temperature between 650 and 800° C. and to accept a lower corundum proportion of 70–80% in the calcination product. An unfavorable influence on the structure development in sintering, such as is known, for example, as development of vermicular, inhomogeneous pore structures with sintering of transitional aluminum oxides undoped or not treated with corundum nuclei, does not occur in this case, because the calcination product produced according to the invention consists in any case predominantly of corundum and, therefore, offers sufficient nuclei for the homogeneous conversion of the residual content of transitional aluminum oxides into $\alpha$-$Al_2O_3$ at sintering. In the interest of extremely fine grains and homogeneity of the resulting nanocorundum, the process is influenced advantageously, if between calcination (conversion of the semiamorphous hydroxide in transitional aluminum oxides) and corundum formation, an additional milling of the transitional aluminum oxides takes place. The milling in an alcohol is particularly advantageous, because here the formation of hydrate bonds between the fine crystalline particles possible in water is suppressed.

Whereas the effect of nuclei promoting corundum formation is a part of common knowledge among experts and, on the other hand, the impossibility has been hitherto documented of thus solving the special task of the production of nanocorundum in the sense described above, the core of the process according to the invention lies in the surprising recognition of a qualitatively different, hitherto unknown effect of nuclei when they are tied into special processes for the hydrolysis of these precursors, which differ for inorganic and organic precursors. The process according to the invention then renders possible not only the reduction of the required corundum formation temperature to $T_\alpha \leq 950°$ C., but combines with it the production of redispersible powder particles having an average particle size in the distribution by volume of $d_{50}<100$ nm in a simple way convertible into practice. Unexpectedly, not only is it possible to thereby produce porous and dense sintering products of the corundum phase with corresponding smaller pore or structural grain size, but the corundum synthesis also runs differently than is known through a semiamorphous aluminum hydroxide, which leads to the formation of finer grain transitional phases of $Al_2O_3$ before corundum formation. Starting from easily manageable raw materials, it is therefore possible to produce nanoporous $Al_2O_3$ sintering products having pore size in the range between 0.5 and 2.5 nm, which differ from previously known nanoporous ceramics in their material structure of $Al_2O_3$ that ensures a high chemical stability and in the simpler production.

The production of redispersible nanocorundum having an average particle size $D_{50}<100$ nm can also be conducted so that organic precursors are used as starting materials. These are likewise processed in a fluid medium to a solution or a sol, with the addition of nuclei that promote the formation of corundum. This is followed by the hydrolysis of the solution or sol either with excess water by adding the precursor solution or precursor sol to water at a mole ratio water:precursor >3, whereby an acid is likewise added that sets the pH=3–5 during the hydrolysis,
or the hydrolysis is brought about by adding a water quantity limited to the mole ratio water:precursor ≦3 and complex-forming ligands to the precursor solution or precursor sol. The ageing is conducted in stages at ≦50° C. within 5 hours and subsequently at 80° C. to 98° C. within 1–24 hours. The subsequent calcination and annealing takes place analogously to the process with the use of inorganic precursors. Redispersible nanocorundum produced according to these two process variations can be in powder form or as dense or porous, compact structures, layers or granulates.

The redispersible nanocorundum powder according to the invention has a median value of particle size distribution $D_{50}$<100 nm, and further advantageously features a narrow width in the size distribution of isometrically shaped particles $D_{84}$≦150 nm, less than 0.05% by weight chlorine and at least 60% $\alpha$-$Al_2O_3$.

The densely sintered corundum granulates or sintered corundum structures according to the invention are sintered preferably at ≦1450° C. and then have an average grain size in the structure of ≦0.6 micron.

The production of sintered porous or dense ceramic structures according to the invention here pertains to porous corundum membranes in the porosity range between typically 10 and 100 nm as well as dense sintered corundum coatings. Production takes place analogously to the process for the production of nanocorundum. Based on known sol/gel processes, the structuring can take place by the hydrolyzed solutions or sols being deposited with conventional measures on porous or dense substrates and dried; for other uses, e.g., the production of sintered grinding material, other forms are to be produced, e.g., granulates of various sizes, by known processes of gel formation or of solid/liquid separation (e.g., rotational evaporation, spray drying, freeze drying).

For the production of porous or dense sinter products, the desired density is obtained either in the course of the annealing required for the corundum formation or is reached in an additional sintering treatment.

The process according to the invention for the production of nanoporous $Al_2O_3$ sintered products (e.g., filtration membranes, gas diffusion barriers, sintered granulates for catalysis or as adsorption agents) includes the following steps.

Either chlorine-free inorganic precursors in the form of salts or organic precursors in the form of aluminum compounds such as, e.g., alkoxides, serve as starting materials.

For the inorganic version, aluminum nitrate is used preferably, however, other compounds can also be used that are easily soluble in water and can be pyrolyzed as free of residue as possible. For industrial handling, the aqueous processing especially of the inorganic salts represents a particular advantage. The concentration of the aqueous salt solutions or sols should lie between 0.01 and 5 M. While lower concentrations are uneconomical, higher concentrations render the synthesis process more difficult and cause an undesirable crystallite growth. Single mole solutions are preferred.

In both process variations with inorganic or organic precursors, an additional 1–5% by weight modifiers, such as nonionic surfactants (e.g., sorbitan esters), anionic surface active materials, inorganic or organic complex-forming ligands (e.g., acetylacetone, ethylacetone acetate, diols) can positively influence the hydrolysis process in that they counteract the formation of agglomerates and thus reduce the size of the synthesized particle, narrow the width of the particle size distribution and promote the formation of a uniform isometric particle shape.

In the case of chlorine-free inorganic precursors, the production of the solution or the sol takes place in a liquid medium. The precursor solution or the precursor sol are then subjected to a controlled hydrolysis by the addition of a base in a mole ratio base:precursor=1 to 3. Examples of suitable bases are $NH_4OH$, $(NH_2)_2CO$, $(NH_4)HCO_3$, $(CH_3)_3NHOH$. The controlled course of the hydrolysis is decisive for the realization of the fine crystalline structures in accordance with the task. The ageing takes place at a temperature of 60–98° C. for a period of 1–72 hours. The result is a semiamorphous aluminum hydroxide that differs decisively from known, conventionally crystallized hydrolysis products, such as gibbsite ($Al(OH)_3$) or boehmite (ALOOH). One of the resulting advantages is the avoidance of highly anisotropic particle shapes and the resulting possibilities, among others, for the construction of nanoporous $Al_2O_3$ filtration membranes of improved permeability.

For the use of organic precursors, organic solvents, e.g., alcohols having a chain length <8, are required. The structure of the solutions or sols formed and the calcination behavior of the gels differ depending on the water content of the hydrolysis medium. If (i) aluminum alkoxides having chain lengths <8 convert into the above-stated semiamorphous aluminum hydroxide with considerable excess water (e.g., with a mole ratio precursor:$H_2O$>50), the solution or sol in water must be adjusted to a pH=3–5 by the addition of substances such as $HNO_3$ or $NH_4NO_3$ and thus stabilized. If, on the contrary, (ii) the hydrolysis takes place in a medium having a lower water proportion predominantly combined in the course of the hydrolysis (mole ratio water:precursor ≦3), the hydrolysis product will be in a medium dominated by an organic solvent and must be stabilized in its dispersed state by suitable complex-forming ligands (e.g., acetylacetone, ethylacetone acetate). In both variations (i) as well as (ii), the precursor solution or the sol is first aged for a period of less than 5 hours at not more than 50° C. (e.g., at room temperature), followed by a 1 to 24-hour ageing period at a higher temperature in the range of 80–98° C.

In the case of the production of porous membranes, the solution or sols are deposited by known measures on a porous substrate and dried. For other uses (e.g., as catalyst carriers in the form of granulates or macroscopic structures of defined geometry) other liquid or dry shaping processes, such as gel formation, casting, and cold isostatic pressure, or processes of solid/liquid separation (e.g., rotational evaporation, spray drying, freeze drying) are useful.

The semiamorphous aluminum hydroxide intermediate product can be converted into $Al_2O_3$ even at low temperatures, whereby the examples will show that, depending on the process route and calcination temperature, different $Al_2O_3$ modifications are adjustable (e.g., for the use as a catalyst, it is often advantageous to avoid crystalline phases [such as $\alpha$-$Al_2O_3$] having inherent catalytic properties and instead, produce an amorphous product). For the purpose of the conversion into an $Al_2O_3$ product, a thermal treatment takes place between 350° C. and 750° C., depending on the desired sintered state. This temperature can be kept low by the addition of $Al_2O_3$ nuclei of the desired phase, which leads to especially small particle sizes and consequently small pore sizes.

If especially porous corundum products are to be produced, an annealing is required at temperatures ≦950° C., preferably at 650–900° C.

The task of the production of denser or more porous sintered products from the nanocorundum according to the invention or its special preliminary stages can be particularly advantageously resolved, if the risk of defect occurrence caused by shrinkage is reduced in that in the modification of the above-described process, in which the shaping takes place analogously to known sol/gel processes even before calcination, this step is undertaken in the powder engineering process only after successful corundum formation; for practicality, the powder is deagglomerated between the annealing required for corundum formation and the shaping process, e.g., by grinding. Such a process is useable regardless of the special form of the resulting products, it is just as useful for structures of regular geometry as for irregularly shaped products (e.g., grinding grits or sintered granulates as catalyst carriers)—the one decisive feature is to associate an adequately high relative density of the "green" (i.e., still unsintered) shaped structures of more than 55% with an optimum homogenous packing structure of the deagglomerated nanoparticles. Such a powder technology using the nanocorundum according to the invention eliminates in the shaped products (membranes, coatings, sintering granulates, sintered shaped structures) the defect-forming influence of shrinkages, such as are connected with the drying of sols or gels, the conversion of the hydroxides into $Al_2O_3$ or the phase conversion of the $Al_2O_3$ at increasing temperature up to corundum formation.

In the deposition especially of corundum coatings, due to this diminished total shrinkage as well as due to the then increased variety of coating possibilities, thicker coatings can be produced than in the scope of the sol/gel processes. At the same time, the advantage of higher sintering activity known from the sol/gel processes is maintained by the low particle size of the nanocorundum. In this manner, dense sintered corundum coatings are already produced with submicrometer structures of average grain size $\leq 0.5$ μm at temperatures $\leq 1250°$ C.

A particularly advantageous utilization of the high potential in sintering capability that distinguishes the nanoparticle is fulfilled when it is successfully possible to realize the most ideal homogeneity of particle packing in the deposited, still unsintered coating, e.g., by deposition of the particle of the hydrolyzed sol or from a suspension of ideally dispersed nanocorundum by electrophoresis. With corresponding homogeneity of particle packing, which of course can also be achieved with other known processes, the temperature for the production of dense sintered structures can be reduced to values $\leq 1150°$ C., and the grain size of the sintered product decreased to values $\leq 0.4$ μm.

Furthermore, electrophoretic processes naturally can also be used for the deposition of coatings from suspensions of the transitional phases calcined according to the invention or of the semiamorphous aluminum hydroxide intermediate product, and can also be used for porous metallic substrates.

The products produced according to the invention have the following outstanding features that are linked in part to special production conditions:

Nanoporous $Al_2O_3$ sintered products produced according to the invention can consist of any phases of the $Al_2O_3$ and show an average pore diameter of 0.5–2.5 nm at a minimum of 30% by volume porosity.

Redispersible nanocorundum, produced according to the process according to the invention using nuclei that promote corundum formation, is characterized by a median value for particle size distribution $D_{50}$<100 nm of the distribution by volume. Particularly advantageous process versions render possible a narrow width of the size distribution of the isometrically shaped particle having $D_{84} \leq 150$ nm.

Porous $Al_2O_3$ sintered products (e.g., filtration membranes, sintering granulates as catalyst carriers) produced according to the invention and sintered in the temperature range between 650 and 1250° C. show a phase composition of more than 80% corundum, combine average pore sizes of 10–100 nm with an open porosity $\geq 30\%$ by volume. The high corundum proportion makes possible a high chemical and thermal stability. Particularly advantageous relevant properties in this regard are achieved with corundum proportions >96%.

Dense corundum coatings, prepared according to the invention and sintered at temperatures $\leq 1250°$ C. on a materially different type of substrate (e.g., metal), granulates or sintered shaped structures have average grain sizes in the structure of not more than 0.5 μm, in the case of dense sintering temperatures $\leq 1150°$ C., even finer structure grain sizes $\leq 0.4$ μm are attained. The $Al_2O_3$ of the dense sintered products has a corundum proportion of 100%.

Dense granulates or sintered shaped structures produced according to the invention, sintered at temperatures $\leq 1450°$ C., consist of corundum having an average grain size in the structure $\leq 0.6$ μm.

BEST WAY OF CARRYING OUT THE INVENTION

Furthermore, the invention is explained in greater detail on several exemplary embodiments.

EXAMPLE 1

All experiments described here omit the use of chlorine-containing precursor starting materials.

Example 1 describes the production of powder form nanocorundum from an inorganic precursor and with use of diaspore nuclei. 5.1 g diaspore crystals (<0.1 μm) were dispersed in 1000 ml of a one-molar aqueous aluminum nitrate solution (pH<2). After heating to 75° C., an ammonia solution was added for the hydrolysis of the aluminum compound, until a mole ratio $[NH_4OH]/Al^{3+}]=2.5$ was reached; in doing so, the pH increased to 4.5. After three days of ageing, the nuclei-containing sol was freeze-dried and the dry substance calcined in an electric oven in air for 1 hour at 850° C. The powder yield was 150 g in this experiment, and distinguishes the process clearly from syntheses described in the literature, which yield only the smallest quantities.

The x-ray diffraction diagram of the nanocorundum powder formed in this way shows a corundum content between 90 and 100% (more accurate statements are possible only at higher cost due to the above-stated difficulties of measurement). In the scanning electron microscope, the product shows a typical size of spherical particles between 25 and 60 nm. After a 6-hour dispersion milling of the aqueous suspension (pH=4) in a high speed, horizontal, attrition ball mill with low abrasion milling beads of partially stabilized $ZrO_2$ (+3 mole % $Y_2O_3$) and separation of a minority of ca. 25% by volume of residual agglomerates by centrifuging, a particle size distribution by volume was determined by means of Zeta-Sizer (Malvern Company, measurement principle: photon correlation spectroscopy), which is characterized by the following parameters: $D_{16}$=47 nm, $D_{50}$=59 nm, $D_{84}$=65 nm ($D_{90}$=67 nm).

In comparison, the data are given of the particle distribution by volume of a fraction <0.2 μm likewise determined with Malvern's Zeta-Sizer, separated from one of the finest grain commercial aluminum oxides (TM-DAR, Boehringer Chemicals Japan); the data in parentheses refer to comparison measurings of the same sample with the Shimadzu centrifuge SA-CP3: $D_{16}$=218 nm (115 nm), $D_{50}$=244 nm (140 nm), $D_{90}$=272 nm (190 nm). Regardless of the limited precision of the different measuring methods, it is obvious that the product according to the invention represents a qualitative leap forward even compared with this fraction of the commercial raw material. A finer grain fraction <100 nm comparable with the product according to the invention cannot, however, be obtained from the advanced commercial powder in economically relevant proportions, as its proportion evidently accounts for less than 10%.

In a second test the calcination temperature was reduced to 785° C. Even under this condition, the corundum content of the product was still more than 60%. The particle size distribution by volume determined after dispersion grinding, at $D_{16}$=34 nm, $D_{50}$=48 nm, $D_{84}$=60 nm, was distinctly finer than in the first test.

A third test conformed with the first in all conditions, only that here the classified diaspore nuclei <0.1 µm were replaced by the same amount of (unclassified) α-$Al_2O_3$ grinding product of the dispersion grinding of the first test. After calcination at 850° C., the phase composition was as described for the first test. With unchanged equiaxed character, the particle shape was more faceted with uneven edges of the particles. Compared with the first test, the powder showed a broader distribution with a somewhat coarser median value of $D_{50}$=63 nm at $D_{84}$=81 nm ($D_{90}$=86 nm).

EXAMPLE 2

For the sol/gel production of a nanoporous amorphous $Al_2O_3$ sintered product with average pore size <2.5 nm, 0.1 mole al-sec-butoxide (ASB) were first complexed with 0.1 mole ethylacetone acetate (EtAc) and subsequently dissolved in 0.5 mole isopropanol. For the purpose of hydrolysis, a mixture of 0.3 mole water and 0.5 mole isopropanol was added to this organic precursor solution drop by drop, so that the mole ratio ASB:$H_2O$ reached a value of 1:3. The mixture produced in this way was stirred for 2 hours at room temperature, this was followed by an aging of a further 2 hours at 95° C. with continued stirring.

The sol formed was deposited by dip coating on a porous substrate of α-$Al_2O_3$. The infiltration of the sol in the upper layers of the substrate is combined with a graduated change in the solids content and triggers the transition into the gel state. After drying and calcination in air, filtration membranes of the following structure resulted (the porosity measurement was made on unsupported (substrate-free) sintered products, as is customary.

| Sinter temperature and duration | Porosity measuring method | Phase Composition | Average pore size | Porosity |
|---|---|---|---|---|
| 400° C./2 h | $N_2$-adsorption/desorption (ASAP-2000) | $Al_2O_3$ (amorphous) | 1.76 nm | 45% by volume |

A slight change in the process and in the calcination temperature leads to products of similar pore size and porosity, but with crystalline definition of the $Al_2O_3$. For this purpose, 0.1 mole al-sec-butoxide (ASB) were first complexed with 0.1 mole ethylacetone acetate (EtAc) and subsequently dissolved in 1 mole isopropanol. For the purpose of hydrolysis, this organic precursor solution was added at room temperature drop by drop to a mixture of $HNO_3$ and water (mole ratio $H_2O$:$HNO_3$+100:0.5) until a mole ratio of ASB:$H_2O$=1:100 was achieved. The mixture produced in this way was stirred for 2 hours at room temperature, this was followed by an aging for a further 2 hours at 95° C. with continued stirring.

The sol formed showed a pH value of 4 and was deposited in the same way on a porous substrate of α-$Al_2O_3$, dried, calcinated and characterized as described above. The result is:

| Sinter temperature and duration | Porosity measuring method | Phase Composition | Average pore size | Porosity |
|---|---|---|---|---|
| 600° C./2 h | $N_2$-adsorption/desorption (ASAP-2000) | γ-$Al_2O_3$ | 2.1 nm | 40% by volume |

EXAMPLE 3

For the sol/gel production of porous $Al_2O_3$ sintered products that with a phase composition of more than 80% corundum (α-$Al_2O_3$) feature average pore sizes between 10 and 100 nm, 0.1 mole al-sec-butoxide (ASB) were first complexed with 0.1 mole ethylacetone acetate (EtAc) and subsequently dissolved in 1 mole isopropanol. For the purpose of hydrolysis, this organic precursor solution was added drop by drop at room temperature to an aqueous suspension of diaspore nuclei (<0.1 µm) acidified with $HNO_3$; the amount of the diaspore nuclei amounted to 10% by weight, relative to the ultimately synthesized $Al_2O_3$ product, the mole ratio $H_2O$:$HNO_3$ was 100:0.1. The drop by drop addition of the precursor solution to the aqueous suspension of diaspore nuclei took place until a mole ratio of ASB:$H_2O$=1:100 was achieved. The mixture produced in this way was stirred for 2 hours at room temperature, this was followed by an aging for a further 2 hours at 95° C. with continued stirring.

The sol formed showed a pH value of 4 and was deposited by dip coating on a porous substrate of α-$Al_2O_3$. The absorption of the sol in the upper layers of the substrate is associated with a graduated change of the solids content and triggers the transition to the gel state. After drying and calcination at different temperatures in air, filtration membranes of the following structure resulted (the porosity measurement was made on unsupported (substrate-free) sintered products, as is customary):

| Sinter temperature and duration | Porosity measuring method | Phase Composition | Average pore size | Porosity |
|---|---|---|---|---|
| 900° C./2 h | $N_2$ adsorption/desorption (ASAP-2000) | α-$Al_2O_3$ | 11 nm | 48% by volume |
| 1000° C./2 h | Hg Porosimeter | α-$Al_2O_3$ | 23 nm | 39% by volume |

EXAMPLE 4

For the production of porous α-$Al_2O_3$ sintered products with pore sizes between 10 and 100 nm by powder processing and in an inorganic way, a nanocorundum powder was produced as in the third test of example 1. After the dispersion milling, at a solids content of 30% by weight, the suspension was deposited by dip coating on a porous substrate of α-Al$_2$O$_3$.

After drying and calcination at different temperatures in air, filtration membranes resulted with the following structure (the porosity measurement was made on unsupported [substrate-free] sintered products, as is customary):

| Sinter temperature and duration | Porosity measuring method | Phase Composition | Average pore size | Porosity |
|---|---|---|---|---|
| 1000° C./2 h | Hg porosimeter | α-Al$_2$O$_3$ | 21 nm | 48% by volume |
| 1100° C./2 h | Hg porosimeter | α-Al$_2$O$_3$ | 26 nm | 45% by volume |
| 1100° C./6 h | Hg porosimeter | α-Al$_2$O$_3$ | 45 nm | 41% by volume |

EXAMPLE 5

A technologically relevant criterium for the actual redispersibility of a nano corundum powder produced by annealing is its usability in a shaping process low in defects and with a low sintering temperature giving dense compacts from the shaped bodies. In an example for the production of dense sintered corundum products of nano corundum powder, particular importance was, moreover, focused on a high purity of the processes and products, any doping to promote the dense sintering or to limit the grain growth was abandoned.

The synthesis of the nano corundum powder resulted as described in example 1 with the following differences: (1) highly pure aluminum nitrate (Al(NO$_3$)$_3$, purity ≧99%), was used as inorganic raw material, (2) after aging for 3 days, the large proportion of the water was separated by centrifugation and the remaining gel-like bottom sediments were freeze dried, (3) commercial grade, highly pure Al$_2$O$_3$ grinding balls (purity ≧99.9%) were used for the dispersion grinding reduced to 3 h of the aqueous suspension of calcinated powder in a high-speed horizontal attrition ball mill.

Compared with the original grinding suspension, the solids content of which was 33% by weight, the separation of the coarser components in the centrifuge reduces the solids content of the remaining, agglomerate-free suspension. This agglomerate-free powder suspension was stirred for 30 min. in the ultrasonic bath during adjustment of the pH value to 4.0 and subsequently filtered in a pressure filtration plant without further change in its solids content. After drying, the samples were pre-sintered in air for 2 h at 800° C. (heating-up rate 0.5 K/min.). Sintering took place at 1285° C. for 2 hours in air and leads to a density of 3.95 g/cm$^3$ (determination by means of Archimedes' method).

The electron-microscopical observation showed an average grain size of 0.6 μm, ascertained by intercepted segment analysis as 1.56-fold of the average chord length. The Vickers hardness was determined on a polished surface with a test load of the indenter of 10 kg to HV10=2121±23 (test according to DINV/ENV 843-4). This value is about 50–100 units above the highest HV10-hardnesses hitherto known for polished surfaces of undoped sintered corundum and underlines the advantages of the use of the nano corundum according to the invention for the production of dense sintered corundum materials of high hardness at low sinter temperature.

What is claimed is:

1. A process for producing redispersible nanocorundum with an average particle size D$_{50}$<100 nm with addition of nuclei that promote transformation to corundum in subsequent annealing, comprising:

(a) dissolving in a liquid medium or processing in a liquid medium to a sol, as starting materials, chlorine-free inorganic precursors;

(b) hydrolyzing the solution or the sol of (a) through the addition of a base in a mole ratio of base:precursor of 1 to 3;

(c) aging the hydrolyzed solution or sol of (b) at temperatures between 60 and 98° C. for 1 to 72 hours;

(d) subsequently drying the aged solution or sol of (c) followed by calcination at temperatures between 350 and 650° C. for converting hydrolyzed precursor into a semiamorphous intermediate phase and ultimately into transitional aluminum oxides; and (e) performing annealing by increasing temperature to ≦950° C. for converting product of (d) into corundum phase.

2. The process according to claim 1 wherein the calcination of (d) is carried out at temperatures of 400 to 600° C. for 0.5 to 2 hours, and the annealing of (e) for formation of corundum is carried out by a temperature increase to 650–900° C. for 0.5 to 1 hours.

3. The process according to claim 1 wherein at least one of the transitional aluminum oxides and corundum are ground.

4. The process according to claim 3 wherein the grinding of the at least one of the transitional aluminum oxides and corundum is carried out in an organic liquid.

5. The process according to claim 1 wherein after the aging of the hydrolyzed solution or sol, a gel formation or a liquid shaping is carried out, subsequently the drying, calcination and annealing take place and after the annealing a sintering is carried out at temperatures above the corundum formation temperature.

6. A process for producing redispersible nanocorundum with an average particle size D$_{50}$<100 nm with addition of nuclei that promote transformation to corundum in subsequent annealing, comprising:

(a) dissolving in a liquid medium or processing in a liquid medium to a sol, as starting materials, organic precursors;

(b) hydrolyzing either (i) with excess water through addition of the precursor solution or the precursor sol of (a) to water at a mole ratio of water:precursor>3, and with addition of an acid that leads to pH=3–5, or (ii) through addition of an amount of water restricted to a mole ratio of water:precursor≦3 to the precursor solution or precursor sol of (a) that are to be mixed with complex-forming ligands;

(c) aging the hydrolyzed solution or sol of (b) at temperatures of ≦50° C. within 5 hours, and subsequently aging at temperatures of 80 to 98° C. within 1 to 24 hours;

(d) subsequently drying the aged solution or sol of (c) followed by calcination at temperatures between 350 and 650° C. for converting the hydrolyzed precursor into a semiamorphous intermediate phase and then to transitional aluminum oxides; and (e) performing annealing by increasing temperature to ≦950° C. for converting product of (d) into corundum phase.

7. The process according to claim 6, wherein the calcination of (d) is carried out at temperatures of 400 to 600° C. for 0.5 to 2 hours, and the annealing of (e) for formation of corundum is carried out by a temperature increase to 650–900° C. for 0.5 to 1 hours.

8. The process according to claim 6 wherein at least one of the transitional aluminum oxides and corundum are ground.

9. The process according to claim 8 wherein the grinding of the at least one of the transitional aluminum oxides and corundum is carried out in an organic liquid.

10. The process according to claim 6 wherein after the aging of the hydrolyzed solution or sol, a gel formation or a liquid shaping is carried out, subsequently the drying, calcination and annealing take place and after the annealing a sintering is carried out at temperatures above the corundum formation temperature.

11. Nanocorundum powders comprising a close particle size distribution in nanometer range, comprising a narrow width of size distribution of isometrically formed particles $D_{84}<150$ nm, less than 0.05% by weight chlorine, at least 60% α-aluminum oxide, and the powders are redispersible.

12. A process for the production of sintered corundum products in a form of dense or porous compact bodies, layers or granulates, comprising sintering nanocorundum powders according to claim 11 at temperatures $\leq 1450°$ C. to form granulate or sintered corundum bodies having an average grain size of $\leq 0.6$ μm.

13. A process for coating a porous or dense metallic substrate wherein particles of the hydrolyzed sol or particles of a suspension of nanocorundum produced according to claim 1 are electrophoretically deposited on the metallic substrate, and subsequently subjected to annealing.

14. A process for coating a porous or dense metallic substrate wherein particles of the hydrolyzed sol or particles of a suspension of nanocorundum produced according to claim 6 are electrophoretically deposited on the metallic substrates, and subsequently subjected to annealing.

15. A process for the production of sintered porous or dense corundum layers on a substrate by a process for producing redispersible nanocorundum with an average particle size $D_{50}<100$ nm with addition of nuclei that promote transformation to corundum in subsequent annealing, comprising:

(a) dissolving in a liquid medium or processing in a liquid medium to a sol, as starting materials, chlorine-free inorganic precursors;

(b) hydrolyzing the solution or the sol of (a) through the addition of a base in a mole ratio of base:precursor of 1 to 3;

(c) aging the hydrolyzed solution or sol of (b) at temperatures between 60 and 98° C. for 1 to 72 hours;

(d) applying the aged hydrolyzed solution or sol of (c);

(e) subsequently drying the applied aged solution or sol of (d) followed by calcination at temperatures between 350 and 650° C. for converting hydrolyzed precursor into a semiamorphous intermediate phase and ultimately into transitional aluminum oxides; and (f) performing annealing by increasing temperature to $\leq 950°$ C. for converting product of (e) into corundum phase.

16. The process according to claim 15 wherein after the aging of the solution or the sol, the material is deposited on a substrate with gel formation.

17. The process according to claim 15 wherein, after the annealing for coverting into the corundum phase, a sintering is carried out at temperatures above the corundum formation temperature.

18. The process according to claim 15 wherein, after the annealing, at least one further coating and at least one further annealing is carried out.

19. A process for the production of sintered porous or dense corundum layers on a substrate by a process for producing redispersible nanocorundum with an average particle size $D_{50}<100$ nm with addition of nuclei that promote transformation to corundum in subsequent annealing, comprising:

(a) dissolving in a liquid medium or processing in a liquid medium to a sol, as starting materials, organic precursors;

(b) hydrolyzing either (i) with excess water through addition of the precursor solution or the precursor sol of (a) to water at a mole ratio of water:precursor>3, and with addition of an acid that leads to pH=3–5, or (ii) through addition of an amount of water restricted to a mole ratio of water:precursor$\leq 3$ to the precursor solution or precursor sol of (a) that are to be mixed with complex-forming ligands;

(c) aging the hydrolyzed solution or sol of (b) at temperatures of $\leq 50°$ C. within 5 hours, and subsequently aging at temperatures of 80 to 98° C. within 1 to 24 hours;

(d) applying the aged hydrolyzed solution or sol of (c);

(e) subsequently drying the applied aged solution or sol of (d) followed by calcination at temperatures between 350 and 650° C. for converting the hydrolyzed precursor into a semiamorphous intermediate phase and then to transitional aluminum oxides; and (f) performing annealing by increasing temperature to $\leq 950°$ C. for converting product of (e) into corundum phase.

20. The process according to claim 19 wherein after the aging of the solution or the sol, the material is deposited on a substrate with gel formation.

21. The process according to claim 19 wherein, after the annealing for coverting into the corundum phase, a sintering is carried out at temperatures above the corundum formation temperature.

22. The process according to claim 19 wherein, after the annealing, at least one further coating and at least one further annealing is carried out.

23. $Al_2O_3$ sintered product comprising a sintered mass of the nanocorundum produced according to claim 5 and which consists essentially of $Al_2O_3$, wherein through annealing at 650 to 1250° C., there is a phase composition of more than 80% corundum and an average pore size of 10–100 nm with a porosity of $\geq 30\%$ by volume.

24. $Al_2O_3$ sintered product comprising sintered corundum layers on a substrate produced according to claim 15 and which consists essentially of $Al_2O_3$, wherein through annealing at 650 to 1250° C., there is a phase composition of more than 80% corundum and an average pore size of 10–100 nm with a porosity of $\leq 30\%$ by volume.

25. $Al_2O_3$ sintered product comprising sintered corundum layers on a substrate produced according to claim 19 and which consists essentially of $Al_2O_3$, wherein through annealing at 650 to 1250° C., there is a phase composition of more than 80% corundum and an average pore size of 10–100 nm with a porosity of $\geq 30\%$ by volume.

26. Dense sinter corundum layers consisting essentially of $Al_2O_3$ on a substrate produced by a process for producing redispersible nanocorundum with an average particle size $D_{50}<100$ nm with addition of nuclei that promote transformation to corundum in subsequent annealing, which process comprises:

(a) dissolving in a liquid medium or processing in a liquid medium to a sol, as starting materials, chlorine-free inorganic precursors;

(b) hydrolyzing the solution or the sol of (a) through the addition of a base in a mole ratio of base:precursor of 1 to 3;

(c) aging the hydrolyzed solution or sol of (b) at temperatures between 60 and 98° C. for 1 to 72 hours;

(d) applying the aged hydrolyzed solution or sol of (c) to a substrates;

(e) subsequently drying the applied aged solution or sol of (d) followed by calcination at temperatures between 350 and 650° C. for converting hydrolyzed precursor into a semiamorphous intermediate phase and ultimately into transitional aluminum oxides; and (f) performing annealing by increasing temperature to $\leq 950°$ C. for converting product of (e) into corundum phase, wherein the substrate is composed of a different material from the corundum layers, and in which through sintering at a temperature of $\leq 1250°$ C. there is an average grain size of $\leq 0.5$ μm.

27. Dense sinter corundum layers consisting essentially of $Al_2O_3$ on a substrate produced by a process for the production of sintered porous or dense corundum layers on a substrate by a process for producing redispersible nanocorundum with an average particle size $D_{50}<100$ nm with addition of nuclei that promote transformation to corundum in subsequent annealing, which process comprises:

(a) dissolving in a liquid medium or processing in a liquid medium to a sol, as starting materials, organic precursors;

(b) hydrolyzing either (i) with excess water through addition of the precursor solution or the precursor sol of (a) to water at a mole ratio of water:precursor>3, and with addition of an acid that leads to pH=3–5, or (ii) through addition of an amount of water restricted to a mole ratio of water:precursor$\leq 3$ to the precursor solution or precursor sol of (a) that are to be mixed with complex-forming ligands;

(c) aging the hydrolyzed solution or sol of (b) at temperatures of$\leq 50°$ C. within 5 hours, and subsequently aging at temperatures of 80 to 98° C. within 1 to 24 hours;

(d) applying the aged hydrolyzed solution or sol of (c) to a substrate;

(e) subsequently drying the applied aged solution or sol of (d) followed by calcination at temperatures between 350 and 650° C. for converting the hydrolyzed precursor into a semiamorphous intermediate phase and then to transitional aluminum oxides; and (f) performing annealing by increasing temperature to $\leq 950°$ C. for converting product of (e) into corundum phase, wherein the substrate is composed of a different material from the corundum layers, and in which through sintering at a temperature of $\leq 1250°$ C. there is an average grain size of $\leq 0.5$ μm.

28. A process for producing nanoporous $Al_2O_3$ sintered products comprising:

(a) dissolving in a liquid medium or processing in a liquid medium to a sol, as starting materials, chlorine-free inorganic precursors;

(b) hydrolyzing the solution or the sol of (a) through the addition of a base in a mole ratio of base:precursor of 1 to 3;

(c) aging the hydrolyzed solution or sol of (b) at temperatures between 60 and 98° C. for 1 to 72 hours; and (d) subsequently drying followed by calcination at temperatures between 350 and 750° C. for converting hydrolyzed precursors into aluminum oxide.

29. A process for production of nanoporous layers comprising:

(a) dissolving in a liquid medium or processing in a liquid medium to a sol, as starting materials, chlorine-free inorganic precursors;

(b) hydrolyzing the solution or the sol of (a) through the addition of a base in a mole ratio of base:precursor of 1 to 3;

(c) aging the hydrolyzed solution or sol of (b) at temperatures between 60 and 98° C. for 1 to 72 hours;

(d) applying the aged solution or the sol of (c) to a substrate; and (e) subsequently drying followed by calcination at temperatures between 350 and 750° C. for converting hydrolyzed precursors into aluminum oxide.

30. The process according to claim 29 wherein gel formation occurs upon application to a substrate.

31. The process according to claim 28 wherein nuclei of a transitional aluminum oxide are added to the solution or to the sol prior to (b).

32. A process for coating a porous or dense metallic substrate comprising:

(a) dissolving in a liquid medium or processing in a liquid medium to a sol, as starting materials, chlorine-free inorganic precursors;

(b) hydrolyzing the solution or the sol of (a) through the addition of a base in a mole ratio of base:precursor of 1 to 3;

(c) aging the hydrolyzed solution or sol of (b) at temperatures between 60 and 98° C. for 1 to 72 hours;

(d) electrophoretically depositing on the metallic substrate particles of the aged hydrolyzed sol or particles of a suspension of nanoporous aluminum oxide of (c); and (e) subsequently drying followed by calcination at temperatures between 350 and 750° C. for converting hydrolyzed precursors into aluminum oxide.

33. The process for coating porous or dense metallic substrates according to claim 32 wherein after the electrophoretic deposit of the particles, a heat treatment is carried out at temperatures of 350–750° C.

34. Nanoporous $Al_2O_3$ sintered products, produced according to claim 28 in which there is an average pore diameter in the range between 0.5 and 2.5 nm at a porosity of $\geq 30\%$ by volume.

35. A process for producing nanoporous $Al_2O_3$ sintered products, comprising:

(a) dissolving in a liquid medium or processing in a liquid medium to a sol, as starting materials, organic precursors;

(b) hydrolyzing either (i) with excess water through addition of the precursor solution or the precursor sol of (a) to water at a mole ratio of water:precursor >3, and with addition of an acid that leads to pH=3–5, or (ii) through addition of an amount of water restricted to a mole ratio of water:precursor ≦3 to the precursor solution or precursor sol of (a) that are to be mixed with complex-forming ligands;

(c) aging the hydrolyzed solution or sol of (b) at temperatures of ≦50° C. within 5 hours, and subsequently aging at temperatures of 80 to 98° C. within 1 to 24 hours; and (d) subsequently drying the aged solution or sol of (c) followed by calcination at temperatures between 350 and 750° C. for converting hydrolyzed precursors into aluminum oxide.

36. A process for production of nanoporous layers comprising:

(a) dissolving in a liquid medium or processing in a liquid medium to a sol, as starting materials, organic precursors;

(b) hydrolyzing either (i) with excess water through addition of the precursor solution or the precursor sol of (a) to water at a mole ratio of water:precursor>3, and with addition of an acid that leads to pH=3–5, or (ii) through addition of an amount of water restricted to a mole ratio of water:precursor≦3 to the precursor solution or precursor sol of (a) that are to be mixed with complex-forming ligands;

(c) aging the hydrolyzed solution or sol of (b) at temperatures of ≦50° C. within 5 hours, and subsequently aging at temperatures of 80 to 98° C. within 1 to 24 hours;

(d) applying the aged solution or the sol of (c) a substrate; and (e) subsequently drying the aged solution or sol of (d) followed by calcination at temperatures between 350 and 750° C. for converting hydrolyzed precursors into aluminum oxide.

37. The process according to claim 36 wherein gel formation occurs upon application to a substrate.

38. The process according to claim 35 wherein nuclei of a transitional aluminum oxide are added to the solution or to the sol prior to (b).

39. A process for coating a porous or dense metallic substrate comprising:

(a) dissolving in a liquid medium or processing in a liquid medium to a sol, as starting materials, organic precursors;

(b) hydrolyzing either (i) with excess water through addition of the precursor solution or the precursor sol of (a) to water at a mole ratio of water:precursor>3, and with addition of an acid that leads to pH=3–5, or (ii) through addition of an amount of water restricted to a mole ratio of water:precursor≦3 to the precursor solution or precursor sol of (a) that are to be mixed with complex-forming ligands;

(c) aging the hydrolyzed solution or sol of (b) at temperatures of ≦50° C. within 5 hours, and subsequently aging at temperatures of 80 to 98° C. within 1 to 24 hours;

(d) electrophoretically depositing on the metallic substrate particles of hydrolyzed sol or particles of a suspension of nanoporous aluminum oxide of (c); and (e) subsequently drying the aged solution or sol of (d) followed by calcination at temperatures between 350 and 750° C. for converting hydrolyzed precursors into aluminum oxide.

40. The process for coating porous or dense metallic substrates according to claim 39 wherein after the electrophoretical deposit of the particles, a heat treatment is carried out at temperatures of 350–750° C.

41. Nanoporous $Al_2O_3$ sintered products, produced according to claim 35 in which there is an average pore diameter in the range between 0.5 and 2.5 nm at a porosity of ≧30% by volume.

42. Nanocorundum powder produced according to the process recited in claim 1 comprising a median value of particle size distribution $D_{50}$<100 nm.

43. Nanocorundum powder produced according to the process recited in claim 6 comprising a median value of particle size distribution $D_{50}$<100 nm.

44. Nanocorundum powders produced according to the process recited in claim 1 comprising a close particle size distribution in nanometer range, comprising a narrow width of size distribution of isometrically formed particles $D_{84}$<150 nm, less than 0.05% by weight chlorine, at least 60% α-aluminum oxide, and the powders are redispersible.

45. Nanocorundum powders produced according to the process recited in claim 6 comprising a close particle size distribution in nanometer range, comprising a narrow width of size distribution of isometrically formed particles $D_{84}$<150 nm, less than 0.05% by weight chlorine, at least 60% α-aluminum oxide, and the powders are redispersible.

* * * * *